US 6,745,483 B2

(12) United States Patent
Ariganello et al.

(10) Patent No.: US 6,745,483 B2
(45) Date of Patent: Jun. 8, 2004

(54) VEHICLE WHEEL TOE-IN ALIGNMENT APPARATUS AND METHOD

(75) Inventors: Bruno Ariganello, St. Catharines (CA); Joseph S. Bonfoco, Fonthill (CA); Rodger Bruce Grant, Port Colborne (CA); Todd Mc Cabe, Welland (CA); David W. Murphy, Fonthill (CA); Marian Jaroslaw Narbutt, Niagara Falls (CA); John Rosbak, Fonthill (CA)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/177,353

(22) Filed: Jun. 21, 2002

(65) Prior Publication Data

US 2003/0233758 A1 Dec. 25, 2003

(51) Int. Cl.$^7$ ................................. G01B 5/255
(52) U.S. Cl. ...................... 33/288; 33/203.18
(58) Field of Search ............... 33/288, 203.18, 33/203.19, 203.2

(56) References Cited

U.S. PATENT DOCUMENTS

| | | | | |
|---|---|---|---|---|
| 3,307,263 A | * | 3/1967 | Castiglia et al. | 33/288 |
| 3,393,455 A | * | 7/1968 | MacMillan | 33/288 |
| 3,782,831 A | | 1/1974 | Senften | 356/152 |
| 4,115,926 A | | 9/1978 | Hampton, Jr. et al. | 33/288 |
| 4,168,909 A | * | 9/1979 | Knudsen et al. | 33/203.18 |
| 4,303,338 A | * | 12/1981 | Morrison et al. | 33/288 |
| 4,455,759 A | * | 6/1984 | Coetsier | 33/288 |
| 4,854,702 A | * | 8/1989 | Stieff | 33/288 |
| 4,863,267 A | * | 9/1989 | Bendickson et al. | 33/288 |
| 4,898,464 A | * | 2/1990 | Thorne et al. | 33/203.18 |
| 5,056,233 A | * | 10/1991 | Hechel et al. | 33/288 |
| 6,293,022 B1 | * | 9/2001 | Chino et al. | 33/203.18 |

* cited by examiner

*Primary Examiner*—Christopher W. Fulton
*Assistant Examiner*—Madeline Gonzalez

(57) ABSTRACT

A vehicle includes a pair of wheel-mounting spindles respectively mounted to a pair of vertically swingable wheel support arms for being steered about respective king pin axes. During assembly of the vehicle on an assembly line, right- and left-hand laser toe gauges are mounted to the spindle shafts in a defined orientation wherein target surfaces of the gauges lie along a respective king pin axis. Length-adjustable tie-rods are coupled to the spindles and adjustable in order that a laser beam emitted from one toe gauge impinges on the target of the other toe gauge when the toe-in is within a prescribed range for resulting in steering and tire wear characteristics. The toe gauges are constructed such that the laser beam direction may be adjusted to calibrate the toe gauge for the particular vehicle being assembled.

10 Claims, 6 Drawing Sheets

VEHICLE WHEEL TOE-IN ALIGNMENT APPARATUS AND METHOD

FIELD OF THE INVENTION

The present invention relates to a laser based toe-in alignment apparatus for a vehicle having suspended, steerable wheels.

BACKGROUND OF THE INVENTION

The toe of the front wheels of a vehicle is defined as the angular relationship of the principal plane of the front wheel to the vertical plane passing through the longitudinal axis of the vehicle. As viewed from overhead, toe dictates whether or not the tires roll straight down the road. We can refer to toe as the angle of attack for the tires as the vehicle is driven forward. If the front of the tires points towards the centerline of the vehicle, with both tires aiming inboard, this is called toe-in, because the tires on that axle are aiming inboard. If the front of the tires is aiming in an outboard direction, away from the centerline of the vehicle, this is referred to as toe-out. A slight amount of toe-in is normally desirable for good handling and tire wear characteristics.

The toe-in of the steerable front wheels of a vehicle has to be properly set since, if otherwise, poor steering and/or high rates of tire wear will occur. Generally, commercially available tools use a vehicle's installed wheels to assess or establish wheel toe-in condition, and lasers and/or mechanical indicating devices are typically employed in these tools and processes. There are laser and mechanical devices and methods that use equipment attached across the vehicles steering components to indicate the state of toe-in. The use of a cross-vehicle mechanical apparatus requires time and care to establish and attachment or alignment to both wheels or rims to allow for toe-in setting and are not easily adapted to the environment of a manufacturing assembly line. One known alignment system required two operators to lift, locate and secure the device across the front of the vehicle. Indicating arms were located on each axle spindle and the tie rod ends were adjusted to bring each of the indicating arms into alignment with target lines on the cross-vehicle device.

U.S. Pat. No. 3,782,831 discloses a toe-in setting assembly including a pair of light-emitting and receiving devices respectively coupled to opposite steerable wheels, the devices being electrically coupled to a control console including display meters for indicating the toe-in angle in accordance with signals sent by the devices. This device requires significant care in its leveling and alignment with each wheel rim before measurements or adjustments can be accurately effected. The set up time for these types of devices are relatively long and significant time is required for an operator to master the technique of properly using these devices. U.S. Pat. No. 4,115,926 discloses a toe-in setting system which is said to overcome the need to level separate devices coupled to wheels, the separate devices of the patent each producing a beam of light and each including a lined target screen for receiving the light beam of the other device.

The prior art also includes a cross-vehicle mechanical apparatus that fastens to each king bolt and uses devices attached to each axle spindle to indicate toe-in relative to a target line of the apparatus. This equipment is time consuming to attach and has excessive setting variability due to parallax between the indicating elements, operator uncertainty with respect to target acquisition and also through the number of interfaces in the process. The weight of this cross-vehicle device needs to be minimized to allow for repeated lifting by assembly operators. The light weight requirement, however, creates a device that is not robust enough to maintain its shape through repeated use.

SUMMARY OF THE INVENTION

According to the present invention, there is provided an improved toe-in setting arrangement which includes a pair of companion toe gauges mounted to the opposite steerable wheels or wheel-mounting spindles of the vehicle.

An object of the invention is to provide a toe-in setting arrangement which includes a pair of companion toe gauges that are each of a simple, reliable design, with the procedure for setting the toe-in with the devices being one that can be quickly mastered by an assembly line worker.

A more specific object of the invention is to provide a toe-in setting arrangement as set forth in the immediately preceding object wherein the toe gauges are particularly adapted for being used in a vehicle assembly line prior to the wheels being mounted on the spindles.

Yet another object of the invention is to provide a toe-in setting arrangement, as defined in the foregoing objects, wherein the mounting of each companion toe gauge to the vehicle requires a minimum number of interfaces with the vehicle.

The objects of the invention are achieved by a toe-in setting arrangement including two opposite hand companion toe gauges, with each device being located on an opposite axle spindle and having a target and a laser light assembly aligned with the longitudinal axis of its associated king pin. Each target has a target face that is located along the axis of the associated king pin. The laser in the device produces a reference beam which is calibrated to produce the required toe-in angle. As the tie rod end is adjusted, the device's laser beam locates the target face of the companion toe-in device. Since the target face is along the king pin axis and the axle spindle rotates about the king pin, each device can be rotated independently without displacing the target provided to the companion toe-in setting device. Thus, the king pins jointly serve as the datum for the toe-in angle.

These and other objects of the invention will become apparent from a reading of the ensuing description together with the appended drawings.

DESCRIPTION OF THE PREFERRED EMBODIMENT

Preliminarily, it is noted that all references made to "right-hand", "left-hand", "right" or "left" are all made relative to a position behind the vehicle and looking in the direction of forward travel.

Figure 1:
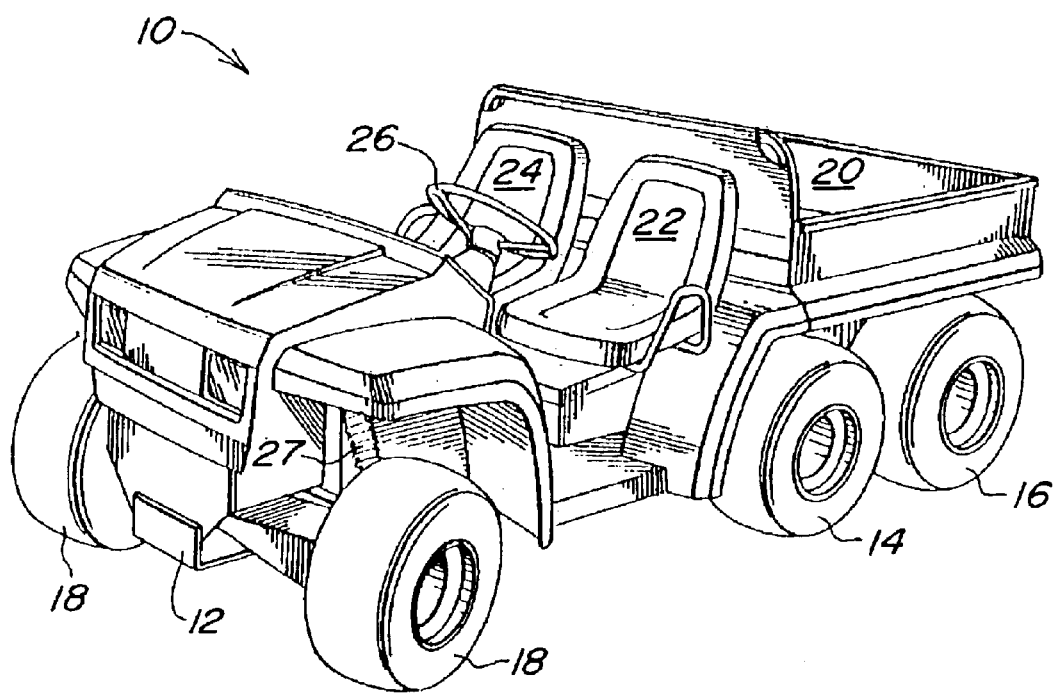
FIG. 1 is a left front perspective view of a vehicle with which the present invention has utility.

Referring now to FIG. 1, there is shown a utility vehicle 10, including a chassis or frame 12 supported on two pairs of driven rear ground wheels 14 and 16, respectively, and a pair of steerable front wheels 18. Mounted to the frame 12 in a location over the rear pairs of wheels 14 and 16 is a cargo bed 20. Driver and passenger seats 22 and 24, respectively, are located just forward of the cargo bed 22 in side-by-side relationship to each other. A steering wheel 26 is located in front of the driver seat 24 for controlling the steering of the front wheels 20, in a more-or-less conventional manner described below in further detail. In a manner described more fully below, the front wheels 18 are suspended from the frame 12 for swinging vertically and this movement is dampened by a spring-over-shock absorber strut arrangement 27 mounted between each wheel support arm and the frame 12.

Figure 2:
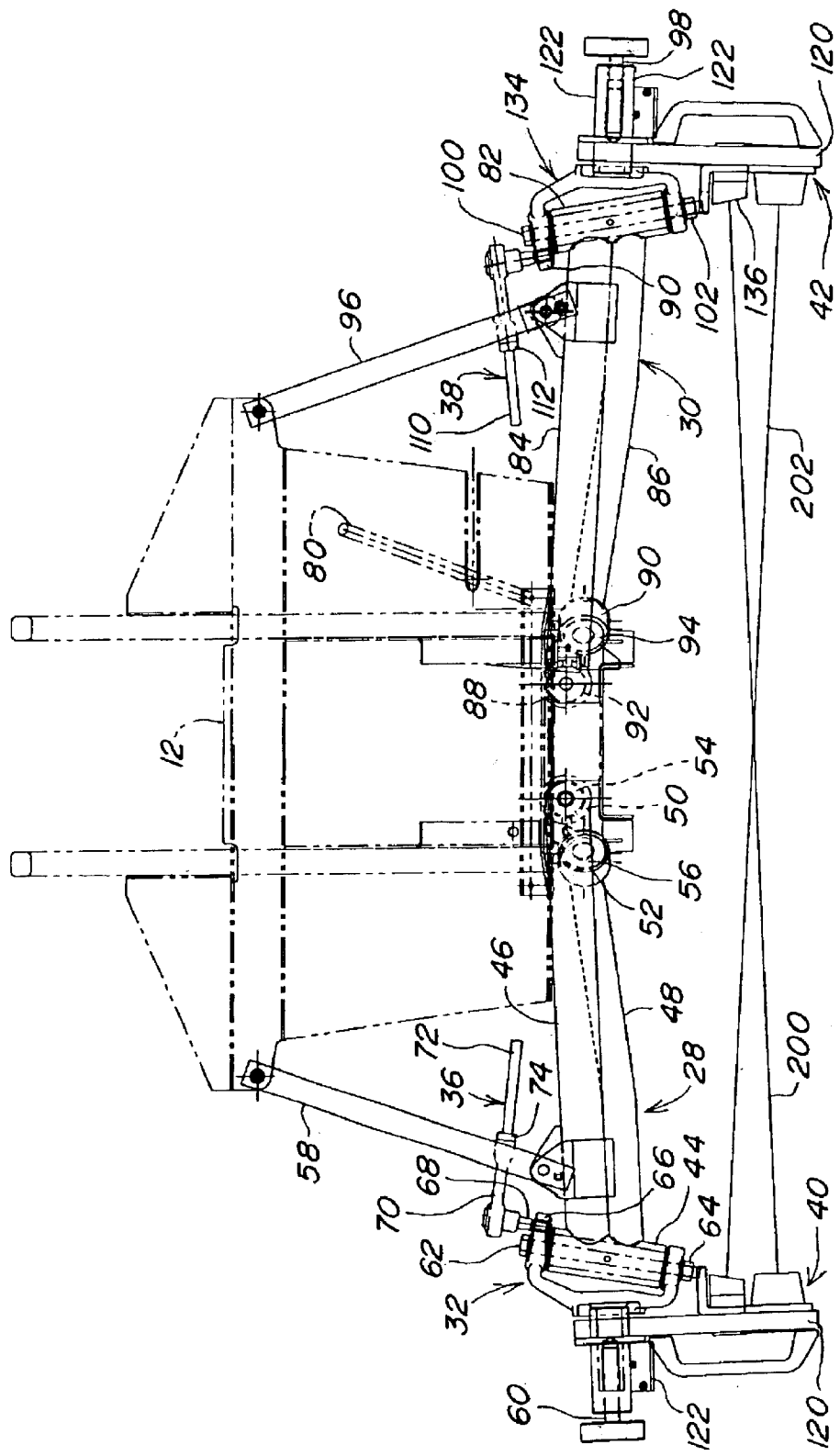
FIG. 2 is a front elevational view showing a partially assembled vehicle in a condition where its toe-in is being checked using the toe-in setting arrangement of the present invention.

Referring now to FIG. 2 there is shown right- and left-hand wheel support arms 28 and 30, respectively, right- and left-hand spindles 32 and 34, respectively, portions of right- and left-hand tie rods 36 and 38, respectively, and right- and left hand laser-based toe gauges 40 and 42, respectively.

The right-hand wheel support arm 28 has an outer end defined by an upwardly and inwardly inclined, cylindrical housing 44 to which is joined outer ends of upper and lower formed tubes 46 and 48, respectively, having fore-and-aft displaced inner ends defined by fore-and-aft extending cylindrical receptacles 50 and 52, in which are received bushings 54 and 56, including elastomeric members. The receptacles 50 and 52 are located between, and coupled to, sets of mounting lugs provided on the support frame 12 by mounting bolts (not shown), the bolts cooperating with the bushings 54 and 56 such that the support arm 28 may swing vertically. Mounted between the frame 12 and the arm 28 so as to retain the latter in a desired location for the toe-in setting operation is a rigid strap 58.

Figure 3:
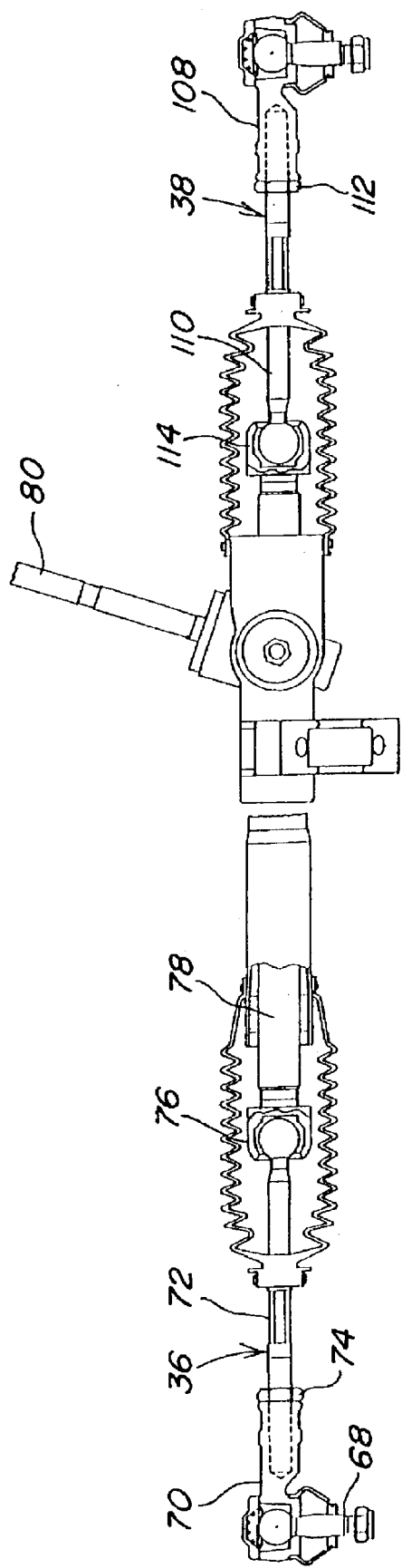
FIG. 3 is a front elevational view of the rack and pinion steering assembly that is only partially shown in FIG. 2.

The spindle 32 is defined by a spindle shaft 60 having a threaded outer end and which extends substantially horizontal for receiving a wheel and wheel mounting nut (not shown) during the assembly process. Provided for mounting the spindle shaft 60 for swiveling about a king pin axis is an integral yoke including upper and lower arms respectively disposed at upper and lower ends of the housing 44 and coupled for rotating within a cylindrical king pin or bushing (not visible) located in the housing 44 by a king bolt 62 having a threaded lower end receiving a nut 64. Referring now also to FIG. 3, it can be seen that the right-hand tie rod 36 is pivotally attached to a steering arm 66 fixed to and projecting rearwardly from the upper yoke of the spindle 32 by a depending stem of a ball connector 68 having its ball end received in a complementary shaped socket formed in an outer end of a tie rod end 70. The tie rod end 70 has a threaded bore receiving a threaded end of an inner section 72 of the tie rod 36, the tie rod end 70 including an integral nut 74 adapted for being engaged with a open end of an adjusting tool. The tie rod 36 is universally coupled, as at a ball-and-socket joint 76, to a right end of a steering output member 78 having a gear tooth rack formed along its length and engaged with a pinion gear carried at the bottom of a steering shaft 80.

Similarly, the left-hand wheel support arm 30 includes an outer end defined by an upwardly and inwardly inclined, cylindrical housing 82 to which is joined outer ends of upper and lower formed tubes 84 and 86, respectively, having inner ends defined by cylindrical receptacles 88 and 90, respectively, which are displaced fore-and-aft from each other and contain bushings 92 and 94, which include elastomeric bodies. The receptacles 88 and 90 are respectively located between pairs of mounting lugs (not shown) joined to the frame 12 and respective mounting bolts (not shown) extend through the lugs and bushings so as to mount the arm 30 to the frame 12 for vertical swinging movement. Mounted between the frame 12 and the arm 30, in lieu of the coil-over-shock absorber strut arrangement 27, which is assembled later in the process, is a rigid strap 96 which serves as a dummy strut to hold the arm 30 at a desired position for the toe-in setting operation. The length of this strut is predetermined to be that which corresponds to that of the strut 27 when the vehicle 10 is parked without a rider or any load, it being noted that an increase in the length of the strap 96 will increase toe-in while a decrease of the length of the strap will increase toe-out, and when weight is added to the machine, toe-in will increase while removal of weight will result in the opposite toe movement.

Figure 4:
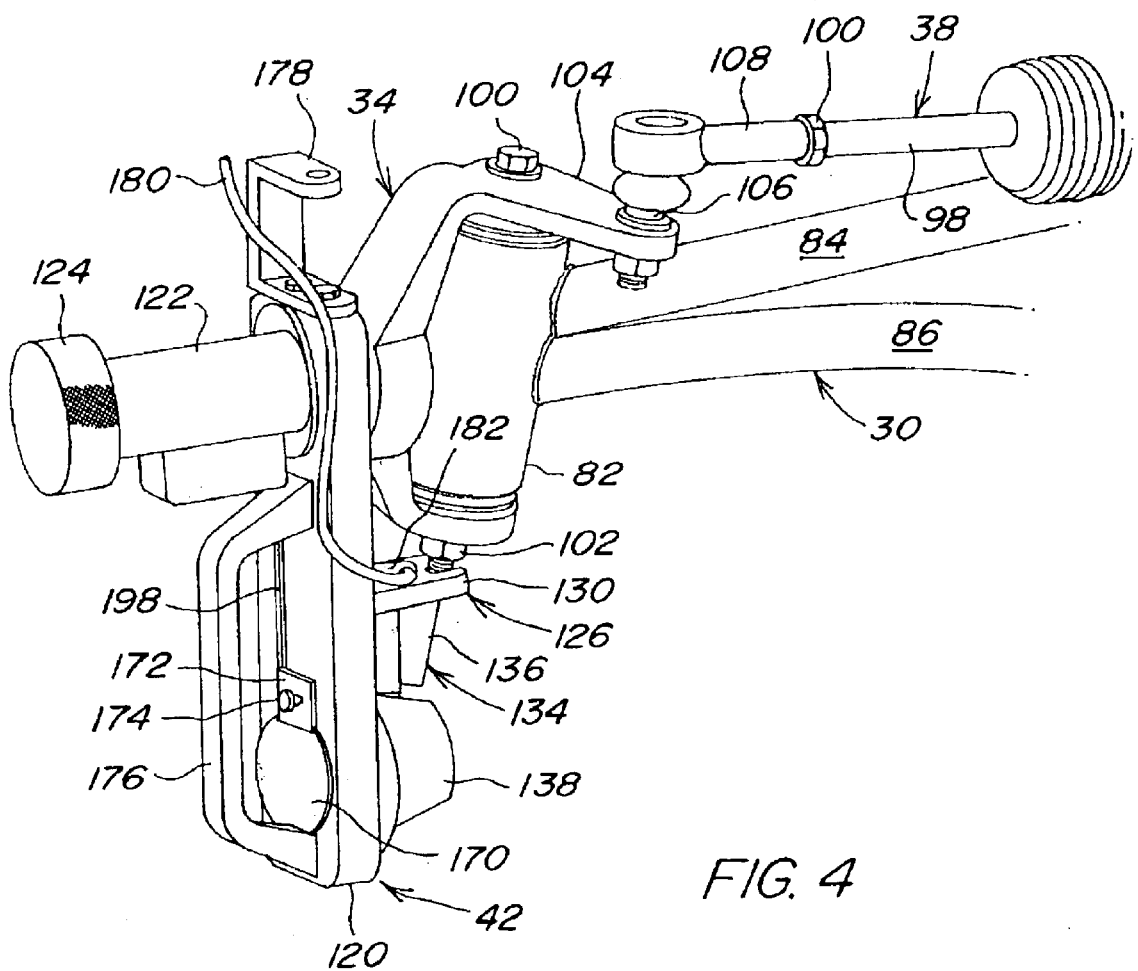
FIG. 4 is a left rear perspective view showing a portion of the left-hand wheel support structure and steering arrangement together with the left-hand toe gauge.

The left-hand spindle 34 is defined by a spindle shaft 98 having a threaded outer end and which extends substantially horizontally for receiving the left-hand wheel 18 and retaining nut (not shown), which are mounted later in the assembly process. Provided for mounting the spindle shaft 98 for swiveling about a king pin axis is an integral yoke including upper and lower arms respectively disposed at upper and lower ends of the housing 82 and coupled for rotating within a cylindrical king pin or bushing (not visible) located in the housing 82 by a king bolt 100 having a lower end receiving a nut 102. Referring also to FIG. 4, it can be seen that the left-hand tie-rod 38 is pivotally attached to a steering arm 104 by a depending stem of a ball connector 106 having its ball end (not visible) located within a complementary ball socket provided at the outer end of a tie rod end 108. The tie rod end 108 has a threaded bore receiving a threaded end of an inner section 110 of the tie rod 38, the tie rod end 108 including an integral nut 112 adapted for being engaged with a open end of an adjusting tool. The tie rod 38 is universally coupled, as at a ball-and-socket joint 114, to a left end of the steering output member 78.

As can be seen in FIG. 2, the right- and left-hand toe gauges 40 and 42 are respectively mounted to the spindle shafts 60 and 98 of the spindles 32 and 34. The toe gauges 40 and 42 are of an identical construction, and for the sake of simplicity, the components of each will be identified with the same reference numerals. Thus, with reference also to FIGS. 3 and 4, it can be seen that each toe gauge 40 and 42 includes an elongate body 120 which, as considered in FIG. 2, is rectangular in side view. Received in a circular opening in an upper location of, and fixed to, the body 120 is a cylindrical spindle receptacle 122, with the receptacles 122 of the devices 40 and 42 respectively being received on spindle shafts 60 and 62. A knurled thumb wheel 124 is joined to a threaded shaft (not visible) and is screwed into an axially threaded bore provided in each of the shafts 60 and 62, and when tightened against the receptacles 122, as illustrated in FIG. 4, holds the toe gauges 40 and 42 securely against a bearing shoulder (not visible) formed on the each of the shafts 60 and 62. As can best be seen in FIG. 5, an inverted L-shaped alignment tab 126 is fixed at a location approximately half-way between top and bottom ends of, and on an inner surface of, the body 120, the tab 126 having a vertical leg 128 and an inwardly projecting horizontal leg 130, the latter having a notch or recess 132 at its inner end which receives the lower end of the adjacent king bolt 62 or 100 when the body 120 is correctly positioned. Fixed to an inner surface of the vertical leg 128 of the alignment tab 126 is a target 134 having an inwardly directed target face 136 located along the axis of the associated king pin bolt 62 or 100. Thus, the target face 136 remains along the king bolt axis no matter what angular position the spindle 34 occupies. Located on the inner surface of the body 120 directly below the target face 136 is a hollow conical housing 138 that contains a laser light assembly 140.

Figure 6:
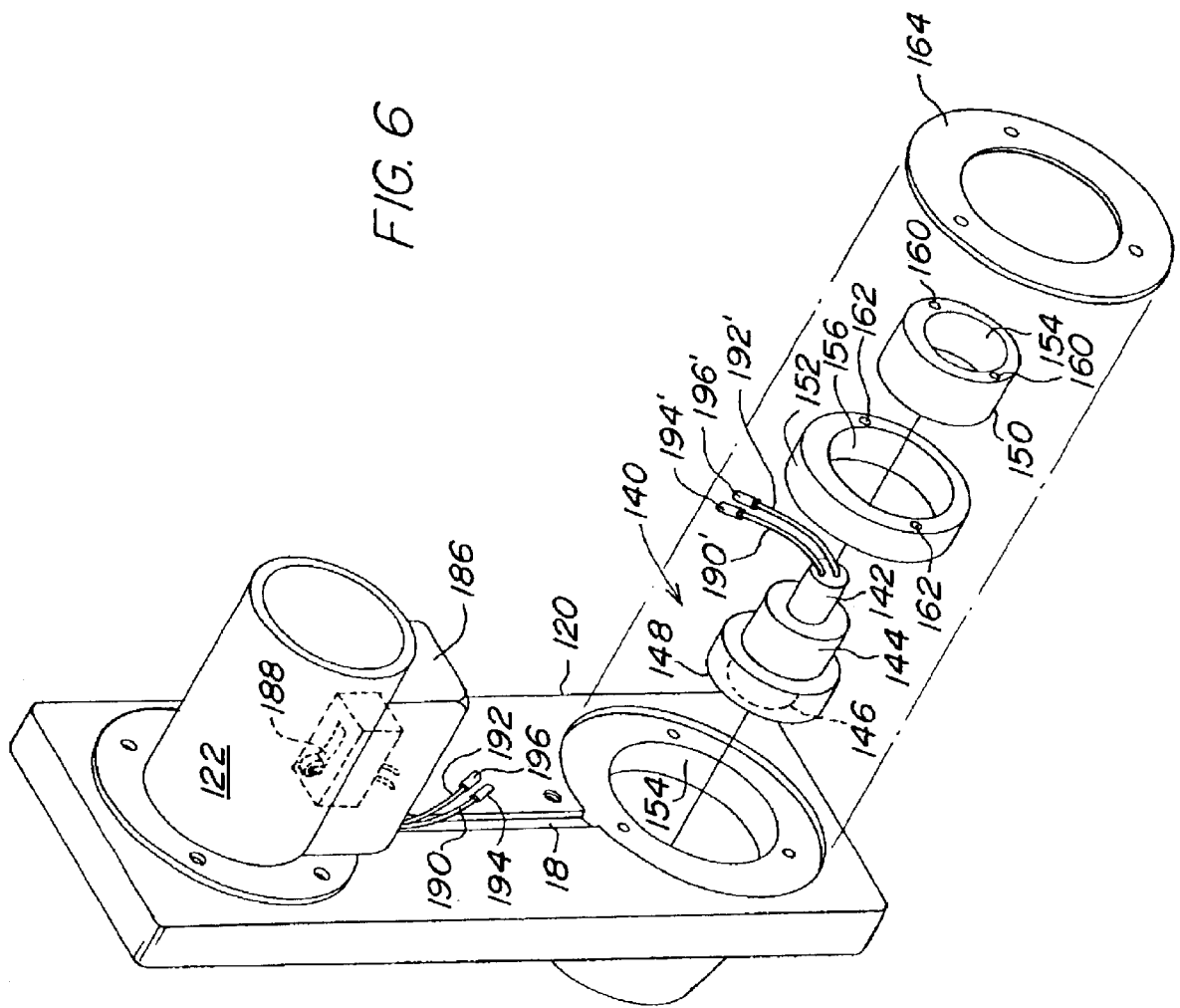
FIG. 6 is a right front perspective view of the left-hand toe gauge with parts removed showing an exploded view of the laser light assembly and the eccentric rings for adjusting the direction of the laser light beam.

Referring now also to FIG. 6, it can be seen that the laser light assembly 140 includes a laser unit 142 fixed to a cylindrical grommet 144 that is in turn coupled to a ball segment 146 located within a complementary socket of a bearing housing 148, the ball segment and housing forming a swivel bearing which permits the direction of the light beam emitted by the laser unit 142 to be adjusted. This adjustment is accomplished by inner and outer adjustment rings 150 and 152, respectively, having eccentric inner bores 154 and 156. The body 120 is provided with a cylindrical opening 158 which leads into the conical housing 138 on the opposite side of the body. The cylindrical grommet 144 of the laser assembly 140 fits snugly within the eccentric bore 154 of the inner adjustment ring 150 and the inner adjustment ring 150 in turn fits snugly within the eccentric bore 156 of the outer adjustment ring 152. The inner adjustment ring 150 is provided with a pair of diametrically opposite pin holes or receptacles 160 for receiving pins of a first adjustment tool (not shown) that is in the form of a ring. Similarly, the outer adjustment ring 152 is provided with diametrically opposite pin holes 162 for receiving pins of a second adjustment tool (not shown) having an inside diameter large enough to loosely fit over the outer diameter of the first tool. Thus, by using the adjustment tools, the adjustment rings 150 and 152 may be rotated relative to each other until the laser unit 142 is aimed to project a light beam in a desired direction, which is determined in a manner described below. Once the laser unit 142 is properly oriented, the adjustment rings 150 and 152 are locked in their adjusted positions by tightening a set of three locking screws (not shown) which are respectively located in a set of three holes 163 provided in a clamping ring 164 and threaded into a set of three threaded holes 166, located in a shoulder 168 surrounding the entrance to the bore 154. The clamping ring is dimensioned to partially overlap the inner end of the outer adjustment ring 152 with the clamping force exerted on the ring 152 acting to cause it to expand radially outward sufficient to effecting a gripping action between the interfaces of the bore 154 and the outer ring 152, the bore 156 of the outer adjustment ring and the outer surface of the inner adjustment ring 150 and the inner bore 154 of the inner ring 150 and the cylindrical surface of the grommet 144.

As can be seen in FIG. 4, the outer end of the bore containing the laser light assembly 140, adjusting rings 150 and 152 and the clamping ring 164 is closed by a cover plate 170, the top of which is held in place by a lip formed on the bottom of a clip 172 secured to the body 120 by a fastener 174. A generally C-shaped handle 176 is secured to the outer surface of the body 120 by screws (not shown) located in top and bottom ends of the handle, with the bottom screw clamping the bottom end of the handle against the lower part of the plate 170. A generally C-shaped hanger bracket 178 is fixed to the top of the body 120 and adapted for being clipped to a flexible tether (not shown) secured to an overhead support of the assembly line so as to suspend the gauge 42 during the time between operations on different vehicles.

Figure 5:
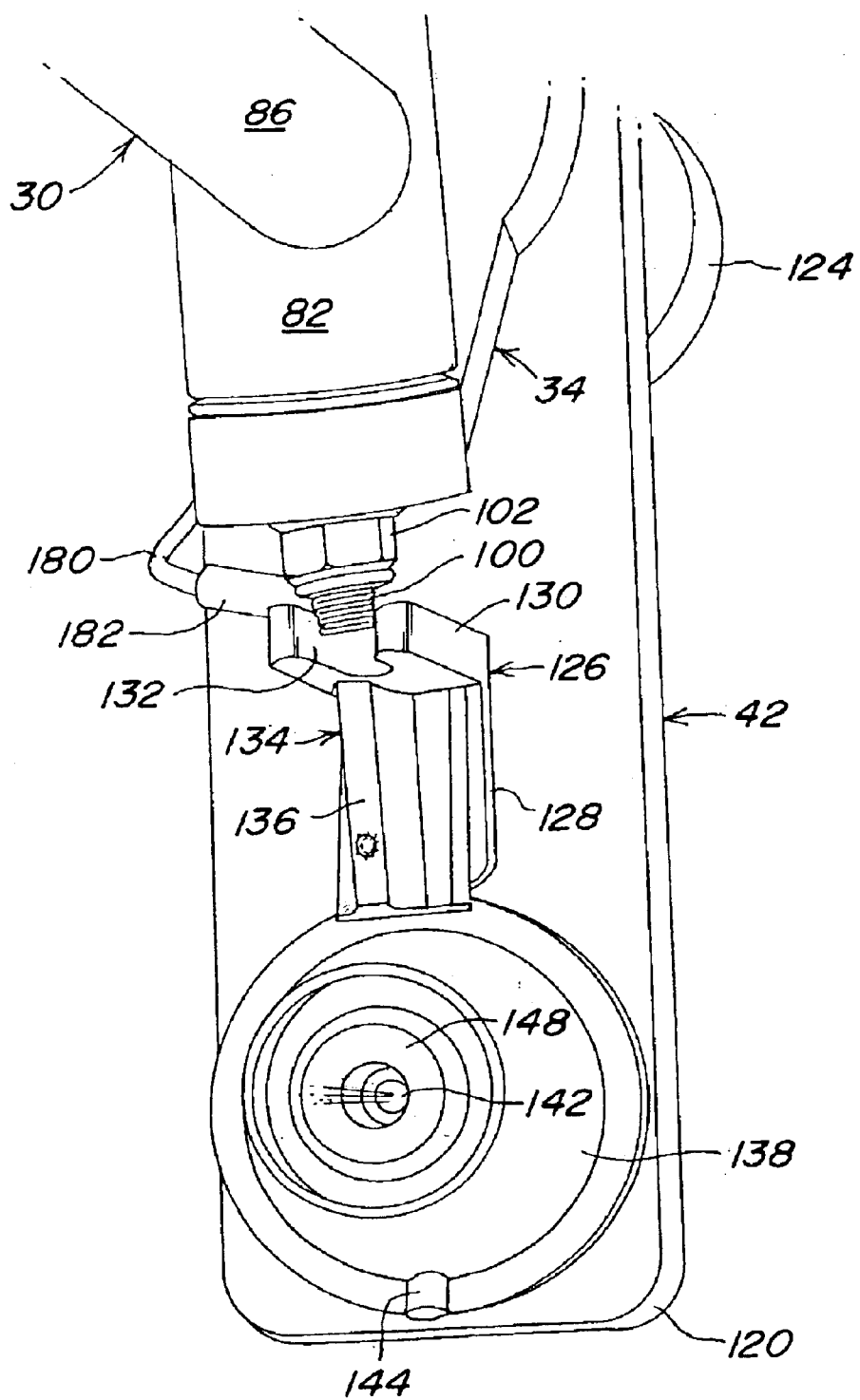
FIG. 5 is a right front perspective view showing the lower portion of the mounting of the left-hand spindle to the king pin, and the left-hand toe gauge.

As shown in FIGS. 4 and 5, power is connected to the laser unit 142 by way of a flexible power line 180 extending from a power source (not shown) and having a coupler 182 containing a pair of leads (not shown) ending in a pair of prongs engaged with mating receptacles formed at the ends of leads of a coupler (not shown) projecting through the inner surface of the gauge body 120 from a passage (not shown) that leads to a wire channel 184 (FIG. 6) formed in the outer surface of the body 120. These leads go to a switch 186 located beneath the spindle shaft receptacle 86 and including a normally open switch element 188 that projects through an opening provided in the receptacle 86 so that it is moved to a closed position only when the toe gauge 42 is mounted on the spindle shaft in a proper position for gauging operation. This ensures that the laser light 142 is not unintentionally illuminated. A pair of lead sections 190 and 192 extend down through the lead channel 184 from the switch 186 and are coupled to lead sections 190' and 192' connected to the laser unit 142. Specifically, the lead section 190 includes a coupler section 194 engaged with a coupler section 194' of the lead section 190'; and the lead section 192 includes a coupler section 196 engaged with a coupler section 196' of the lead section 192'. These separable coupler sections may be selectively uncoupled, as shown in FIG. 6, so that the lead sections 190' and 192' may be coupled so as to power the laser unit 142 from an alternate location, such as at a test bed when the laser light assembly 140 is being calibrated, i.e., adjusted for emitting light in a desired direction for impinging the target surface 136 of a companion toe gauge. An elongate cover element 188 (FIG. 4) is releasably retained over the lead channel 184.

Referring to FIG. 2, it can be seen that when the toe-in is properly set on both sides of the vehicle, in a manner described below, the laser light from the right-hand toe gauge 40 will emit a beam 200 which impinges on the target face 136 of the left-hand toe gauge 42, while the left-hand gauge 42 will emit a beam 202 which impinges on the target face 136 of the right-hand gauge 40.

OPERATION

The first step in preparing for setting the toe-in on vehicles 10 being assembled on an assembly line is to calibrate the companion set of toe gauges 40 and 42, respectively. This is done by taking the gauges 40 and 42 to a previously prepared test bed which replicates wheel mounting aspects of the particular vehicle being gauged. The following steps are then performed relative to each gauge:

1. The cover plate 170 and cover element 198 are removed from the gauge body 120 to gain access to the adjustment rings 150 and 152, and to the wiring in the lead channel 184 by removing the fastener 174 from the retaining clip 172 and the mounting screw of the handle 176.
2. Next, the coupler sections 194 and 194' of the lead sections 190 and 190', and the coupler sections 196 and 196' of the lead sections 192 and 192 are disconnected so that the laser unit 142 is disconnected from the switch 186.
3. The three set screws holding the clamping ring 164 are loosened so as to free the inner and outer adjustment rings 150 and 152.
4. The shaft receptacles 122 of the toe gauges 40 and 42 are then mounted on the respective shafts of the test bed that replicate the right- and left-hand spindle shafts of the vehicle to be gauged, with the thumb wheels 124 being applied to the threaded shaft ends to hold the gauges in place.
5. Then, for setting the beam alignment of the right-hand gauge 42, two concentric ring-like adjustment tools are then slipped over the leads going to the laser unit 142, with respective pins of the inner tool being placed into the pin holes or receptacles 160 of the inner adjustment ring 150 and with the pins of the outer tool being placed into the holes or receptacles 162 of the outer adjustment ring 152.

6. The lead coupler sections 194' and 196' of the lead sections 190' and 192' going to the laser unit 142 are coupled to a test bed power source.

7. Next, the ring-like tools are swiveled relative to each other so as to cause corresponding swiveling of the adjustment rings 150 and 152 so as to cause the light beam emitted by the laser unit 142 to be directed onto the target face 136 of the left-hand toe gauge 42.

8. The three locking screws of the clamping ring 164 are then tightened to retain the adjustment rings 150 and 152 in their adjusted positions.

9. The toe gauge 40 is then removed from the shaft, the lead portions going to the laser unit 142 are disconnected from the test bed power source, and the two ring-like tools are removed.

10. The lead portions 190' and 192' going to the laser unit 142 are then reconnected with the lead portions 190 and 192 going to the switch 186, the cover plate 170 and cover element 198 are re-installed and the right-hand toe gauge 40 is once again mounted on the axle of the appropriate spindle shaft of the test bed.

11. The same adjustment process may be applied for adjusting the position of the laser beam of the left-hand toe gauge 42 either concurrently with, or subsequently to, the adjustment of the right-hand toe gauge 40, the adjustment motion of either not affecting the other.

Once the right- and left-hand gauges 40 and 42 are calibrated, they are removed front the test bed and their hanger brackets 178 are coupled to respective tethers at the assembly line location where the gauges are to be used. One of the gauges 40 and 42 is plugged into the power source at the assembly line by establishing the connection between the coupler 182 of the power line 180 with the coupler at the inner surface of the gauge body 120.

Once a partially assembled vehicle 10 is moved into place, the toe gauges are mounted on the spindle shafts 60 and 90, with the recesses 132 of the respective alignment tabs 126 having the lower ends of the king bolts 62 and 100. The vehicle steering shaft 80 is rotated to a position corresponding to straight ahead steering of the vehicle and fixed in place.

Assuming the right-hand toe gauge 40 to be the one coupled to power, the laser light unit 142 will become energized only after the shaft receptacle is mounted in place on the spindle shaft 60, it being noted that during this mounting the normally open switch 186 is closed to complete the circuit to the laser light unit 142. The operator will observe whether or not the emitted laser light beam is impinging on the target face 136 of the left-hand gauge 42. If it is does, the toe-in is correct and corresponds to that of the "standard" of the test bed set up. If not, the operator will engage the tie-rod end nut 74 with a wrench or tool and turn it in the appropriate direction for causing the right-hand spindle to be adjusted so as to cause the laser beam emitted from the right-hand toe gauge 40 to impinge on the target face 136 of the companion gauge 42, this impingement indicating that the correct toe-in has been set. The procedure will then be duplicated for setting the toe-in of the left-hand side of the vehicle, with the operator manipulating the tie-rod end nut 112 if necessary to cause the position of the left-hand spindle to be adjusted such that the laser beam emitted by the left-hand toe gauge 42 impinges the target face 136 of the right-hand toe gauge 40.

Having described the preferred embodiment, it will become apparent that various modifications can be made without departing from the scope of the invention as defined in the accompanying claims.

What is claimed is:

1. A toe gauge, adapted for use with a substantially identical companion toe gauge in gauging the toe of a vehicle having a wheel spindle mounted to a wheel support for swiveling about a king bolt axis and being adjustable for effecting toe changes in a wheel mounted to the spindle, comprising:

an elongate body;

an attaching member joined to said elongate body adjacent a first end of said body and cooperating with said body to define a spindle receptacle having a first axis and adapted for receiving, and being supported by, the vehicle wheel spindle for swiveling about a spindle axis defined by a wheel mounting shaft of said spindle;

a laser beam target surface being fixed to said body and located along a second axis which intersects first said axis at a location on an opposite side of said body from said attaching member, and defines a included acute angle with said first axis so as to be located along said king bolt axis when said gauge is in a preselected angular location about said spindle axis and adapted for being impinged by a laser beam of a companion gauge mounted on an opposite side of the vehicle when the toe of a wheel at the opposite side of the vehicle is within a desired range;

a locator positioned along said second axis between said target surface and said first axis so as to engage structure associated with said spindle so as to retain said gauge in said preselected angular location; and a laser unit mounted to said body at a location approximately along said second axis for directing a beam toward a target surface of the companion gauge.

2. The toe gauge, as defined in claim 1, wherein said attaching member is in the form of a cylindrical receptacle adapted for receiving said shaft of said spindle.

3. The toe gauge, as defined in claim 2, and further including a normally closed switch mounted adjacent said receptacle and having a switch element projecting into said receptacle for being actuated to a position for closing said switch when said receptacle is mounted on a spindle shaft for gauging the toe thereof; and a pair of electrical leads extending from said switch to said laser unit for energizing the latter only when said receptacle is located on said spindle shaft, whereby inerrant energization of said laser unit is prevented.

4. The toe gauge, as defined in claim 3, wherein said pair of electrical leads each have a separable coupler located therein between said switch and said laser unit, whereby said coupler of each lead may be separated, and recoupled to a power source so that said laser unit may be powered without closing said switch.

5. The toe gauge, as defined in claim 1, wherein said locator includes a notch adapted for receiving a lower end of a king bolt.

6. The toe gauge, as defined in claim 1, wherein said toe gauge includes an adjustable mounting for said laser unit for permitting said laser unit to be adjusted so as to change the direction of said beam.

7. The toe gauge, as defined in claim 4, wherein said toe gauge includes a laser unit housing having a bore having a longitudinal axis;

said laser unit including a cylindrical grommet; and said adjustable mounting including at least one adjustment ring mounted in said bore of said housing for swiveling about said axis and having an eccentric bore receiving said cylindrical grommet for shifting the latter relative to said axis for adjusting the angularity, and/or fore-and-aft position of said beam.

8. The toe gauge, as defined in claim 7, wherein said adjustable mounting includes a second adjustment ring mounted in said bore for swiveling about said axis of said bore of said housing; and said second adjustment ring including an eccentric bore receiving said at least one adjustment ring, whereby said at least one and second adjustment rings may be swiveled relative to each other so as to adjust the angularity, and/or fore-and-aft position of said beam.

9. The toe gauge, as defined in claim 8, wherein said at least one and second adjustment rings are each provided with diametrically opposite pairs of pin receptacles adapted for receiving pins of respective adjustment tools.

10. A method for setting the toe-in of a steerable vehicle including a steering shaft coupled to right- and left-hand spindles by right- and left-hand, length-adjustable tie rods, with the right- and left-hand spindles being mounted to respective vertically swingable wheel support arms for swiveling about respective king pin axes, the method including the steps of:

(a) locking the steering shaft in a position corresponding to that for effecting straight ahead movement of the vehicle;

(b) placing respective toe gauge targets at like locations along each king pin axis;

(c) placing a beam emitting laser at like locations adjacent each toe gauge target; and (d) adjusting each length-adjustable tie-rod until the beam emitted by each laser impinges on the target adjacent the other laser.

* * * * *